United States Patent [19]

Packett

[11] Patent Number: 5,094,029
[45] Date of Patent: Mar. 10, 1992

[54] GROWING PLANT SUPPORT SYSTEM

[76] Inventor: Marion J. Packett, P.O. Box 129, Warsaw, Va. 22572

[21] Appl. No.: 641,466

[22] Filed: Jan. 15, 1991

[51] Int. Cl.$^5$ .................. A01G 17/06; A01G 17/14
[52] U.S. Cl. ............................................. 47/44; 47/46
[58] Field of Search ................................ 47/44–47, 47/30, 32, 9

[56] References Cited

U.S. PATENT DOCUMENTS

| | | | |
|---|---|---|---|
| 11,153 | 6/1854 | Cross | 47/44 |
| 35,474 | 12/1865 | Glentzer | 47/44 |
| 47,415 | 4/1865 | Greene | 47/44 |
| 88,074 | 3/1869 | Rathbun | 47/44 |
| 680,507 | 8/1901 | Thomas | 47/44 |
| 1,864,672 | 6/1932 | Rose et al. | 47/9 |
| 2,940,219 | 6/1960 | Schiller | 47/9 |
| 3,328,915 | 4/1965 | Elbert | 47/44 |

FOREIGN PATENT DOCUMENTS 928023  11/1947  France ................................. 47/32

*Primary Examiner*—David A. Scherbel
*Assistant Examiner*—Michele A. Van Patten
*Attorney, Agent, or Firm*—W. Brown Morton, Jr.

[57] ABSTRACT

An improved system is disclosed for the growing of plants, especially fruiting plants such as tomatoes and cucumbers, which enables the bearing vines to be supported on pervious ventilating surfaces forming a V-shaped valley, the bottom of which is the row of plants flanked by impervious, gently inwardly sloping panels substantially preventing weed growth and delivering rain or spray falling onto the vines into the row. Such valleys can be advantageously arranged parallel and separated by a walkway of mowable turf.

4 Claims, 1 Drawing Sheet

GROWING PLANT SUPPORT SYSTEM

BACKGROUND OF THE INVENTION

Growing plants is an ancient calling and systems for supporting the plants to improve their yield and make their care and harvesting easier have been in use from prehistoric times. Various vineyard systems come to mind at once, but a glance at a nineteen nineties gardener's store's stock shows that supports for vegetables such as tomatoes and cucumbers, for examples, are also much in use in a variety of forms. The present invention offers a novel and advantageous improvement in this ancient art, providing secure support for the growing plant, ease of access for cultivation and fruit picking, weed control, proper watering, and improved appearance. Installations can be made using materials readily available nearly everywhere and reasonably priced.

FIELD OF THE INVENTION

This invention relates to a system for growing garden plants, particularly summer vegetables such as tomatoes and cucumbers in temperate zones outdoors, utilizing, in a novel combination, support stakes, wire screen, and sheet material, such as plywood.

DESCRIPTION OF THE PRIOR ART

The field of gardening is so widely dispersed in time and space that no one can, with any hope of completeness, claim to know all systems of plant support that have been tried, not even if the field of relevant prior use be accepted as limited to use "in this country" (35 USC §102).

The following patent documents chronologically listed, include the most relevant art now known to applicant:
1. U.S. Pat. No. 680,507 to Thomas, Aug. 13, 1901;
2. U.S. Pat. No. 950,639 to Petzler, Mar. 1, 1910;
3. Hungarian 48,413 to Meyer, Mar. 29, 1910;
4. Austrian 41,648 to Schmidt, Apr. 11, 1910;
5. German 288,351 to Robert, Oct. 29, 1915;
6. U.S. Pat. No. 1,916,868 to Starke, July 4, 1933;
7. U.S. Pat. No. 2,940,219 to Schiller, June 14, 1960;
8. U.S. Pat. No. 3,005,287 to Dudley, Oct. 24, 1961;
9. Swiss 477,811 to Mueller-Furter, Oct. 31, 1969;
10. German 2,031,196 to Krause, Jan. 5, 1972; and
11. Russian patent SU 1-205-830-A to Mukhin, Jan. 23, 1966.

None of these patents discloses the combination and arrangement of structural elements of applicant's invention nor his inventive system of plant support that his specific combination and arrangement embodies. It is true, however, that most of these patents do disclose one or more structural elements that could be included in, or adapted for inclusion in, his combination or that do perform one or more of the functions accomplished in his system.

SUMMARY

This invention is particularly useful to the home gardener and small scale producers of fruits and vegetables to be hand-picked and, during the growing season at least, hand-cultivated and weeded. It is not specially suitable for machinery-intensive, large-scale mass production. It employs a support structure, conveniently wooden, holding up inwardly, downwardly slanting screen surfaces forming two facing planes in an essentially V-shaped valley with the plants to be supported rooted along a row between the lower edges of the planes and sending their fruit bearing vine growths upward over one on the other of the upper surfaces of those planes. The sloping surfaces of these support screens are made of chicken wire or other freely pervious sheet material, for example, plastic netting, to permit virtually unobstructed airflow through them to ventilate plant foilage supported by them without collecting rain water or spray. Beneath and extending outwardly from the plant row defining lower edges of the main support screens along the ground surface, essentially impervious sheet material panels are placed with their outer edges somewhat elevated. These panels serve to channel reinwater (or spray) falling on the supported vines onto the plant roots in the row and to prevent material growth of weeds between the rows.

DETAILED DESCRIPTION

Figure 1:
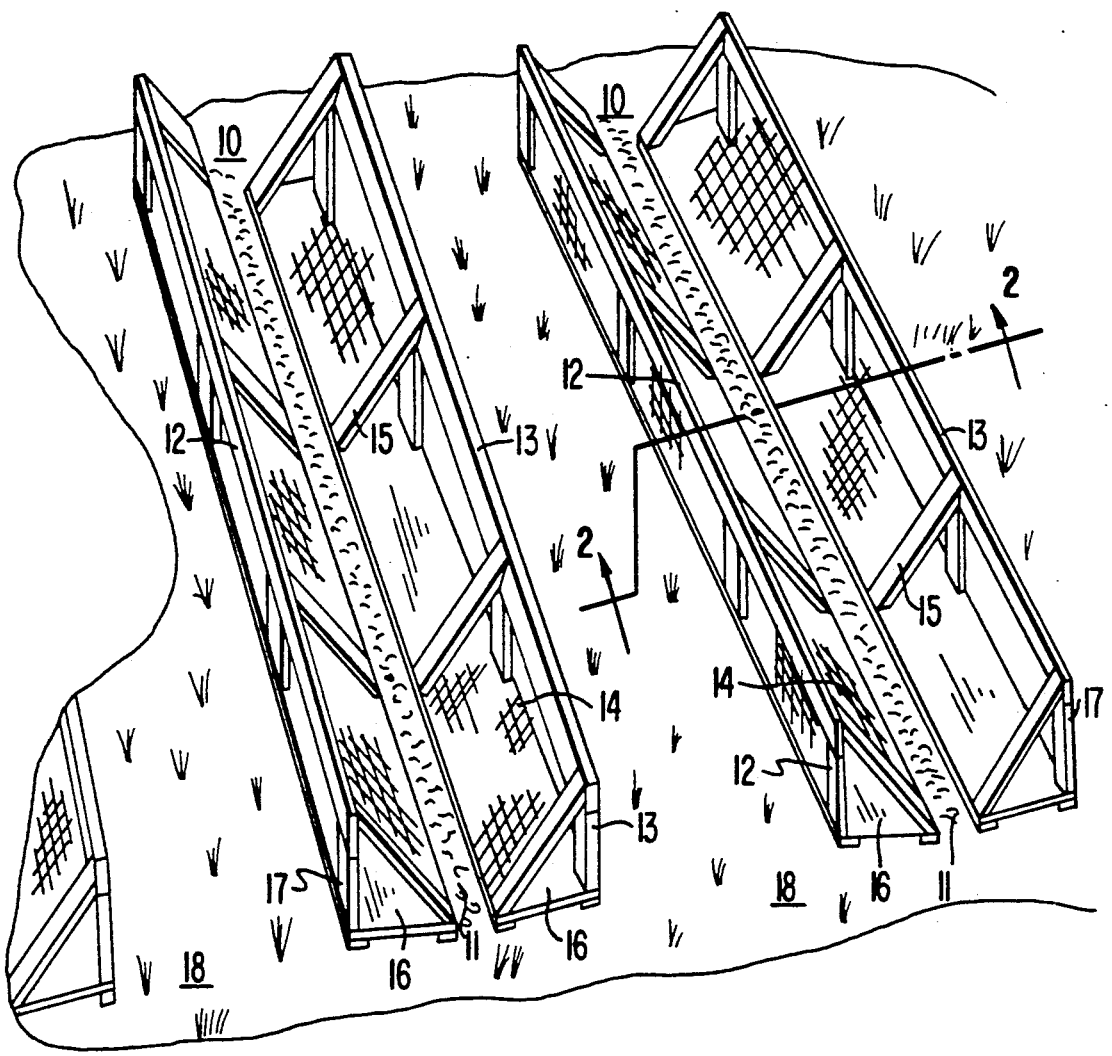
FIG. 1 is a perspective view from above of two rows of plant support structures according to the invention, ready for planting.
Figure 2:
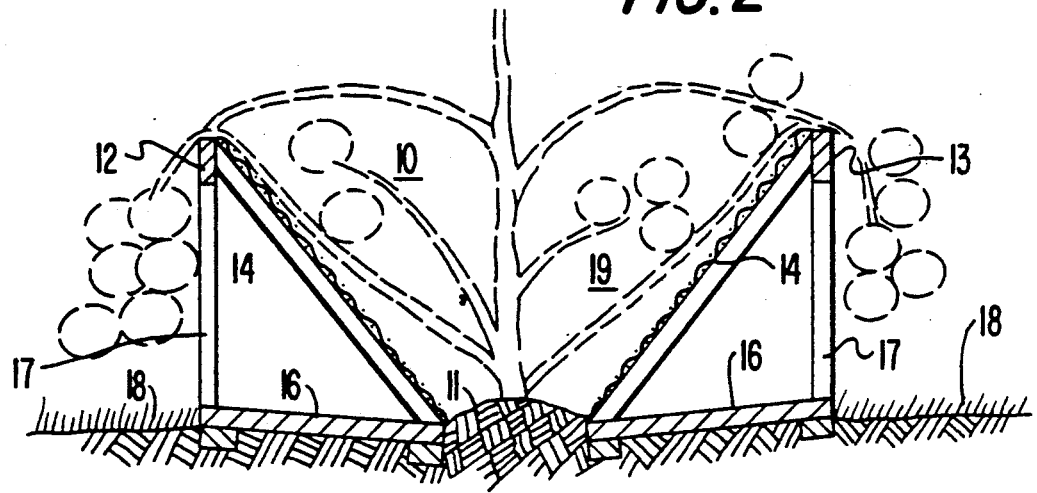
FIG. 2 is a transverse cross-sectional view on the plane 2—2 of FIG. 1, showing, in phantom, a plant growing in the row.

Shown in FIGS. 1 and 2 is an economical and satisfactory arrangement of structures for practicing the system of my invention, described in terms of representative materials and dimensions. Basically, the arrangement comprises chicken wire "valleys" 10, the bottoms of each valley being a strip 11 of planting earth, four or so inches wide, extending the length, 10 to 20 feet, of the row to be planted.

The two facing frames 12 and 13 which hold the wire "slopes" 14 or the diagonal members 15 of each valley provide floors 16 of plywood (or other sheet material) not quite level, lying on the ground and draining gently inward to the strip 11 in which the row of plants is to grow. The vertical outer back uprights 17 of each pair of frames 12, 13 that form a valley 10 are separated by a yard or so of turf 18 that will not get muddy and can be mowed. The scale of the valleys is such as to permit the vines 19 climbing the chicken wire faces 14 to be reached from the turf 18 and also to hang down the backs so that their fruits can be conveniently picked. This scale also permits the strips 11 to be weeded if need be. The bottom sheets 16 are impervious to weeds.

The diagonal 15 and uprights 16 and other members forming the frames 12, 13 for the faces 14 are suitably made from wood on the order of 1" square. Thus a complete structure for practicing the system of my invention can be made of materials readily available in farm, garden, and building supply outlets nationwide.

We claim:

1. A system for growing fruiting plants such as tomato and cucumber vines comprising the steps of: selecting a tract of suitable planting earth; delineating one or more relatively narrow strips thereon; bordering at least one side of a strip with an essentially impervious layer of material, substantially coplanar therewith, but sloping gently downward theretoward; erecting above said layer a supporting surface formed of coarsely-spaced, grid or net arranged, wire-like elements substantially coextensive with said layer and sloping steeply downward toward said strip; and planting plants that are to be grown in said strip, whereby weeds are substantially prevented from growing through said layer, the plants' growing vines can be supported by said surface, rain or other spray falling on said vines can penetrate said surface and be delivered by said layer to said strip, and said vines are fully ventilated.

2. The system according to claim 1 in which both sides of the strip are so bordered.

3. The system according to claim 2 in which a plurality of parallel bordered strips are provided, separated by a mowable turf walkway.

4. A frame structure useful in growing fruiting plants such as tomato and cucumber vines comprising vertical, horizontal, and diagonal members, which members are interconnected to form a prism of nearly right triangular cross-section, outer surface of the hypotenuse plane of which prism faces upward and is a wire-like net or grid, the vertical plane of which is open, and the nearly horizontal plane of which is a substantially impervious sheet.

* * * * *